United States Patent
Boshoff et al.

(10) Patent No.: US 10,834,289 B2
(45) Date of Patent: Nov. 10, 2020

(54) DETECTION OF STEGANOGRAPHY ON THE PERIMETER

(71) Applicant: International Business Machines Corporation, Armonk, NY (US)

(72) Inventors: Dusty Boshoff, Centurion (ZA); Anthony M. Butler, Dubai (AE)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 14/670,966

(22) Filed: Mar. 27, 2015

(65) Prior Publication Data

US 2016/0283746 A1    Sep. 29, 2016

(51) Int. Cl.
G06F 21/62    (2013.01)
H04N 1/44    (2006.01)
H04N 1/32    (2006.01)

(52) U.S. Cl.
CPC ....... *H04N 1/4446* (2013.01); *G06F 21/6263* (2013.01); *H04N 1/32149* (2013.01); *H04N 1/32352* (2013.01)

(58) Field of Classification Search
CPC ............. H04N 1/4446; H04N 1/32149; H04N 1/32352; G06F 21/6263
USPC .......................................................... 726/30
See application file for complete search history.

(56) References Cited

U.S. PATENT DOCUMENTS

| | | | |
|---|---|---|---|
| 5,613,004 A * | 3/1997 | Cooperman | G06T 1/0021 348/E7.056 |
| 8,391,543 B1 | 3/2013 | Verma | |
| 8,744,120 B2 * | 6/2014 | Reed | G06T 1/005 382/100 |
| 9,319,384 B2 * | 4/2016 | Yan | H04L 63/145 |
| 9,419,998 B1 * | 8/2016 | Yan | H04L 63/145 |
| 2002/0157005 A1 * | 10/2002 | Brunk | G06Q 20/401 713/176 |
| 2005/0030589 A1 * | 2/2005 | El-Gazzar | H04N 1/32005 358/402 |

(Continued)

OTHER PUBLICATIONS

Cornelissen, "Covert Channel Data Leakage Protection," Master of Science Thesis 647, Jun. 25, 2012, p. 1-87, Radboud Universiteit Nijmegen.

(Continued)

*Primary Examiner* — Michael S McNally
(74) *Attorney, Agent, or Firm* — L. Jeffrey Kelly

(57) ABSTRACT

A method to detect a plurality of steganography based information embedded in a multimedia file associated with an online computer environment is provided. The method may include detecting the multimedia file entering or exiting an online environment associated with a network or an organization. The method may also include comparing a stored hashed version of the detected multimedia file to the detected version of the multimedia file. The method may also include comparing a stored perceptual hashed version of the detected multimedia file to the detected version of the multimedia file based on the detected multimedia file not matching the stored hashed version of the detected multimedia file. The method may further include assigning a flag attribute to the detected multimedia file based on the detected multimedia file matching the stored perceptual hashed version of the detected multimedia file.

20 Claims, 6 Drawing Sheets

(56) References Cited

U.S. PATENT DOCUMENTS

| | | | | |
|---|---|---|---|---|
| 2005/0060643 | A1* | 3/2005 | Glass | G06F 17/241 715/205 |
| 2006/0149823 | A1* | 7/2006 | Owen | G06Q 10/107 709/206 |
| 2006/0239501 | A1* | 10/2006 | Petrovic | G06T 1/0028 382/100 |
| 2008/0016365 | A1* | 1/2008 | Moskowitz | G06F 21/10 713/176 |
| 2009/0328186 | A1* | 12/2009 | Pollutro | G06F 21/31 726/13 |
| 2009/0328210 | A1 | 12/2009 | Khachaturov et al. | |
| 2011/0078256 | A1* | 3/2011 | Wang | G06Q 10/107 709/206 |
| 2011/0243327 | A1* | 10/2011 | Strein | G10L 19/018 380/253 |
| 2012/0210447 | A1* | 8/2012 | Vazquez | H04N 21/25875 726/28 |
| 2013/0208941 | A1 | 8/2013 | Liu | |
| 2013/0227714 | A1* | 8/2013 | Gula | G06F 21/64 726/32 |
| 2013/0298254 | A1 | 11/2013 | Thomas Hall et al. | |
| 2014/0331338 | A1 | 11/2014 | Serita et al. | |
| 2015/0194159 | A1* | 7/2015 | Mai | G10L 19/018 381/119 |
| 2015/0317325 | A1* | 11/2015 | Key | G06F 21/564 707/770 |
| 2015/0319138 | A1* | 11/2015 | Yan | H04L 63/1416 726/11 |
| 2016/0217545 | A1* | 7/2016 | Diehl | G06T 1/0021 |
| 2016/0234228 | A1* | 8/2016 | Yan | H04L 63/145 |

OTHER PUBLICATIONS

Huang, "Image Duplication Detection," HZQTC, Apr. 19, 2013, p. 1-3, http://hzqtc.github.io/2013/04/image-duplication-detection.html, Accessed on Mar. 19, 2015.

Kent et al., "Guide to Integrating Forensic Techniques into Incident Response," National Institute of Standards and Technology Special Publication 800-86, Aug. 2006, NIST Computer Security.

Kessler, "An Overview of Steganography for the Computer Forensics Examiner," Gary Kessler Associates Library, Feb. 2004, p. 1-29, http://www.garykessler.net/library/fsc_stego.html, Accessed on Mar. 19, 2015.

Klinger et al., "pHash," The Open Source Perceptual Hash Library, Updated Apr. 23, 2014, p. 1-3, http://www.phash.org/, Accessed on Mar. 19, 2015.

Mell et al., "The NIST Definition of Cloud Computing," National Institute of Standards and Technology, Information Technology Laboratory, Oct. 7, 2009, Version 15.

Omagicq et al., "I thought SSL Traffic couldn't be inspected?," Broadband Tech Forums, Jul. 13, 2012, p. 1-5, DSLReports, http://www.dslreports.com/forum/r27327202-I-thought-SSL-Traffic-couldn-t-be-inspected-, Accessed on Mar. 19, 2015.

Richer, "Steganalysis: Detecting Hidden Information with Computer Forensic Analysis," SANS Institute Information Security Reading Room, 2003, p. 1-11, Version 1.4b.

Sarc, "Digital Steganography An Emerging Threat," Steganography Analysis and Research Center, Sep. 2013, p. 1-63, Backbone Security.com, Inc.

Sarc, "StegAlyzerRTS," Steganography Analyzer Real-Time Scanner, 2014, Steganography Analysis and Research Center, Backbone Security.com, Inc.

Si, "Steganalysis," Athabasca University COMP607 Project, Jul. 25, 2004, p. 1-3, http://io.acad.athabascau.ca/~grizzlie/Comp607/steganalysis.htm, Accessed on Mar. 19, 2015.

Wikipedia, "Acoustic fingerprint," Wikipedia: the Free Encyclopedia, Last Modified on Jan. 3, 2015, p. 1-2, http://en.wikipedia.org/wiki/Acoustic_fingerprint, Accessed on Mar. 19, 2015.

Wikipedia, "MD5," Wikipedia: the Free Encyclopedia, Last Modified on Feb. 24, 2015, p. 1-12, http://en.wikipedia.org/wiki/MD5, Accessed on Mar. 19, 2015.

Wikipedia, "Secure Hash Algorithm," Wikipedia: the Free Encyclopedia, Last Modified on Feb. 19, 2015, p. 1-3, http://en.wikipedia.org/wiki/Secure_Hash_Algorithm, Accessed on Mar. 19, 2015.

Wikipedia, "Steganography," Wikipedia: the Free Encyclopedia, Last Modified on Feb. 25, 2015, p. 1-11, http://en.wikipedia.org/wiki/Steganography#Countermeasures_and_detection, Accessed on Mar. 19, 2015.

Boshoff et al., "Improving the Detection of Steganography on the Perimeter," English Application and Drawings, Filed on Mar. 22, 2016, 32 Pages, DE Patent Application Serial No. 102016204698.5.

Wikipedia, "Steganalysis," Wikipedia: the Free Encyclopedia, Last Modified on Dec. 26, 2016, Printed on Jan. 30, 2017, p. 1-4, hllps://n.wikipedia.org/wiki/Steganalysis, Accessed on Jan. 30, 2017.

* cited by examiner

DETECTION OF STEGANOGRAPHY ON THE PERIMETER

BACKGROUND

The present invention relates generally to the field of computers, and more particularly to detecting steganography.

Today, companies may use technologies such as DLP (Data Loss Prevention) to protect against sensitive data being stolen or accidentally leaving a network or an organization (i.e., an online environment) electronically via emails or file upload services. As such, companies may first have to classify or qualify potentially sensitive information and documents to DLP systems in order to accurately detect the sensitive information in conventional internet traffic and to make sure that the "classified as sensitive" data does not leave the network or organization.

Steganography is used to hide information by embedding messages within other, seemingly harmless messages. As such, steganography may replace bits of useless or unused data in regular computer files (such as graphics, sound, text, or HTML) with bits of different, invisible information. This hidden information can be plain text, cipher text, or even images. Additionally, steganography may be used when encryption is not permitted. However, steganography may also be used to supplement encryption. For example, an encrypted file may still hide information using steganography, so even if the encrypted file is deciphered, the hidden message is not seen.

SUMMARY

According to one embodiment, a method to detect a plurality of steganography based information embedded in a multimedia file associated with an online computer environment is provided. The method may include detecting the multimedia file entering or exiting an online environment associated with a network or an organization. The method may also include comparing a stored hashed version of the detected multimedia file to the detected version of the multimedia file. The method may also include comparing a stored perceptual hashed version of the detected multimedia file to the detected version of the multimedia file based on the detected multimedia file not matching the stored hashed version of the detected multimedia file. The method may further include assigning a flag attribute to the detected multimedia file based on the detected multimedia file matching the stored perceptual hashed version of the detected multimedia file.

According to another embodiment, a computer system to detect a plurality of steganography based information embedded in a multimedia file associated with an online computer environment is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include detecting the multimedia file entering or exiting an online environment associated with a network or an organization. The method may also include comparing a stored hashed version of the detected multimedia file to the detected version of the multimedia file. The method may also include comparing a stored perceptual hashed version of the detected multimedia file to the detected version of the multimedia file based on the detected multimedia file not matching the stored hashed version of the detected multimedia file. The method may further include assigning a flag attribute to the detected multimedia file based on the detected multimedia file matching the stored perceptual hashed version of the detected multimedia file.

According to yet another embodiment, a computer program product to detect a plurality of steganography based information embedded in a multimedia file associated with an online computer environment is provided. The computer program product may include one or more computer-readable storage devices and program instructions stored on at least one of the one or me tangible storage devices, the program instructions executable by a processor. The computer program product may include program instructions to detect the multimedia file entering or exiting an online environment associated with a network or an organization. The computer program product may also include program instructions to compare a stored hashed version of the detected multimedia file to the detected version of the multimedia file. The computer program product may also include program instructions to compare a stored perceptual hashed version of the detected multimedia file to the detected version of the multimedia file based on the detected multimedia file not matching the stored hashed version of the detected multimedia file. The computer program product may further include program instructions to assign a flag attribute to the detected multimedia file based on the detected multimedia file matching the stored perceptual hashed version of the detected multimedia file.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
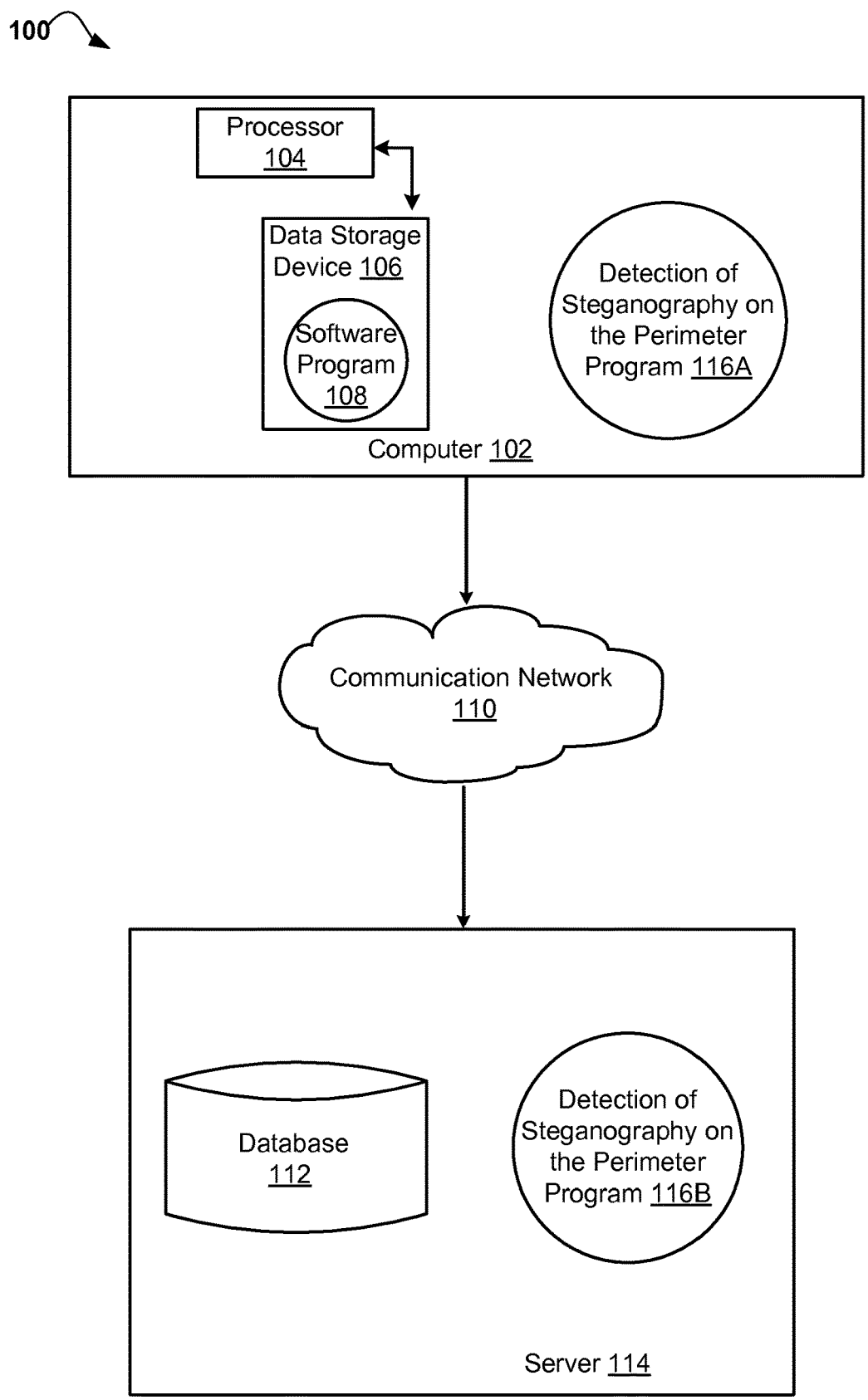
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to detecting steganography. As such, the present embodiment relates to improving the detection of steganography at the perimeter level of a network or an organization. More specifically, the present embodiment may improve the detection of steganography or a security breach based sensitive information leakage in multimedia files from a network or an organization in an automated perimeter system/border router based fashion. Therefore, the present embodiment has the capacity to improve the technical field of detecting steganography by applying a comprehensive hashing method that is not dependent on signatures of fingerprints or 'known forms' of steganography to the detection of multimedia files that have been used to hide information through steganography.

As previously described, companies may first have to classify or qualify potentially sensitive information and documents to DLP systems in order to accurately detect the sensitive information in conventional internet traffic and to make sure that the "classified as sensitive" data does not leave the organization. Additionally, industrial espionage, disgruntled employees or even malware can use steganography to hide classified documents and even malware configuration information within normal images and audio files such as JPEG, GIF, BMP and MP3. Since more email signatures have become static images in emails, some criminals have started using email signatures to hide confidential information with steganography.

StegAnalysis is a technique where a user can manually extract the data hidden in an image or audio file. Then, using steganography techniques, the specific image or audio file suspected of hiding confidential information can be manually analyzed using techniques, such as StegAnalysis to extract the hidden document. However, StegAnalysis is an expensive process and being able to do it efficiently on the network perimeter is not available by existing technology since current technology is bound to a limited amount of static signatures and fingerprints that require updates or even user intervention. As such, it may be advantageous, among other things, to improve the detection of steganography on the perimeter.

According to at least one implementation, the present embodiment may improve the detection of steganography based sensitive information leakage in multimedia files from a network or an organization in an automated perimeter system/border router based fashion. The present embodiment may introduces a more comprehensive hashing method to be applied to the detection of multimedia files that have been used to hide information through steganography. The present embodiment is not dependent on signatures of fingerprints in the automated detection process since the method does not know the files that have been subjected to steganography, but rather creates a profile (i.e., a record) for each multimedia file. The present embodiment may provide a method of detecting steganography through perceptual hashing (i.e., capturing how the multimedia file looks) in addition to conventional hashing methods (i.e., capturing what the multimedia file consists of in terms of bits and byte comparison and acoustic fingerprinting).

The present embodiment detects and assists in detecting steganography at the perimeter level of a network or organization. As such, the present embodiment may improve the detection of steganography at the perimeter level of a network or organization by being able to compare the original file to a hashed sample to detect steganography without fingerprints or signatures; by comparing file size bytes in size revealing specific hidden files to detect steganography; and by labelling every multimedia file on entering the organization to detect steganography. Therefore, the present embodiment may enhance the perimeters' capability to detect steganography including enhancing the perimeter with an inspection capability using scanning techniques which provide an automated way to search for confidential information leaving a network or an organization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to improve the detection of steganography on the perimeter. Usually images, such as comic strips or logos are shared by users and they pass back and forth over a network several times over a short period, or even continuously. According to at least one implementation, the present embodiment may leverage this social behavior. As such, when multimedia files enter or exit an organization, it is possible to hash the images and audio files using algorithms, such as MD5, SHA, perceptual hashing, acoustic fingerprinting and audio content indexing. These hashes are the same as a fingerprint to the file on different levels (e.g., content levels or bit levels) and may effect each algorithm in its unique way. Therefore, according to at least one implementation, after the file has been hashed (i.e., profiled), a copy may be saved in a repository which can be used at a later time by an investigator during an investigation where comparisons between original and modified files using perceptual hashing, such as StegAnalysis is required.

Additionally, the present embodiment may also collect and store statistics and information about the multimedia file, such as size, perceptual hash information, bit level hash information, byte file size information, source information, destination information, user information, and machine information. This information may be attached with the file or in a separate repository and may then be used to answer questions, such as the following profiling information questions about the file:

1. when was the file downloaded?
2. what user-agent was used to download the file?
3. which machine downloaded the file?
4. which user name downloaded the file?
5. what was the original file size in bytes?
6. are there any MD5/SHA hashes (for any file)?
7. are there any perceptual hashes (if file is an image or video)?
8. is there any acoustic fingerprinting (if file is an audio file)?
9. is there any audio content (indexed)?

Therefore, if any part of the parameter changes when the file is seen again, it may cause a cascading effect where different parameters may hold different weights, which then may raise flags for investigation. As such, using hashing technology, such as MD5, SHA, perceptual hashing algorithms, acoustic fingerprinting, and also Audio Content Indexing, the present embodiment has the ability to build a profile for any multimedia file and identify when an original file has been modified since it was last observed.

For example, according to at least one implementation, if a file passing through the system fails its hashing comparison sequence that was recorded when the file was first seen, then the present embodiment may flag the file as suspicious and therefore, the file may be subjected to techniques, such as StegAnalysis to see if any sensitive information has been hidden within the image or audio file. Then, the cache of the files and their hash can be maintained by the present embodiment for short periods based on users' social behavior.

Unlike current methods that perform a comparison between a transformed version of the source file and the source file itself, the present embodiment selects a suspected file and a source file and performs a perceptual compare to determine if the images "look the same" and then performs a hash compare to determine if individuals are the same at a binary level. If the images "look the same" and "are the same" at a binary level, then no steganography is found. However, if the images are the same at a perceptual level, but different in a binary composition, then the present embodiment may determine that there is a probability that steganography has been used.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Detection of Steganography on the Perimeter Program 116A. The networked computer environment 100 may also include a server 114 that is enabled to run a Detection of Steganography on the Perimeter Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Detection of Steganography on the Perimeter Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Detection of Steganography on the Perimeter Program 116A, 116B may interact with a database 112 that may be embedded in various storage devices, such as, but not limited to a computer/mobile device 102, a networked server 114, or a cloud storage service.

As previously described, the client computer 102 may access the Detection of Steganography on the Perimeter Program 116B, running on server computer 114 via the communications network 110. For example, a user using a client computer 102 may use the Detection of Steganography on the Perimeter Program 116A, 116B to improve the detection of steganography on the perimeter. As such, the Detection of Steganography on the Perimeter Program 116A, 116B, may improve the detection of steganography based sensitive information leakage in multimedia files from a network or an organization in an automated perimeter system/border router based fashion. The Detection of Steganography on the Perimeter method is explained in more detail below with respect to FIG. 2A-2B.

Figure 2A:
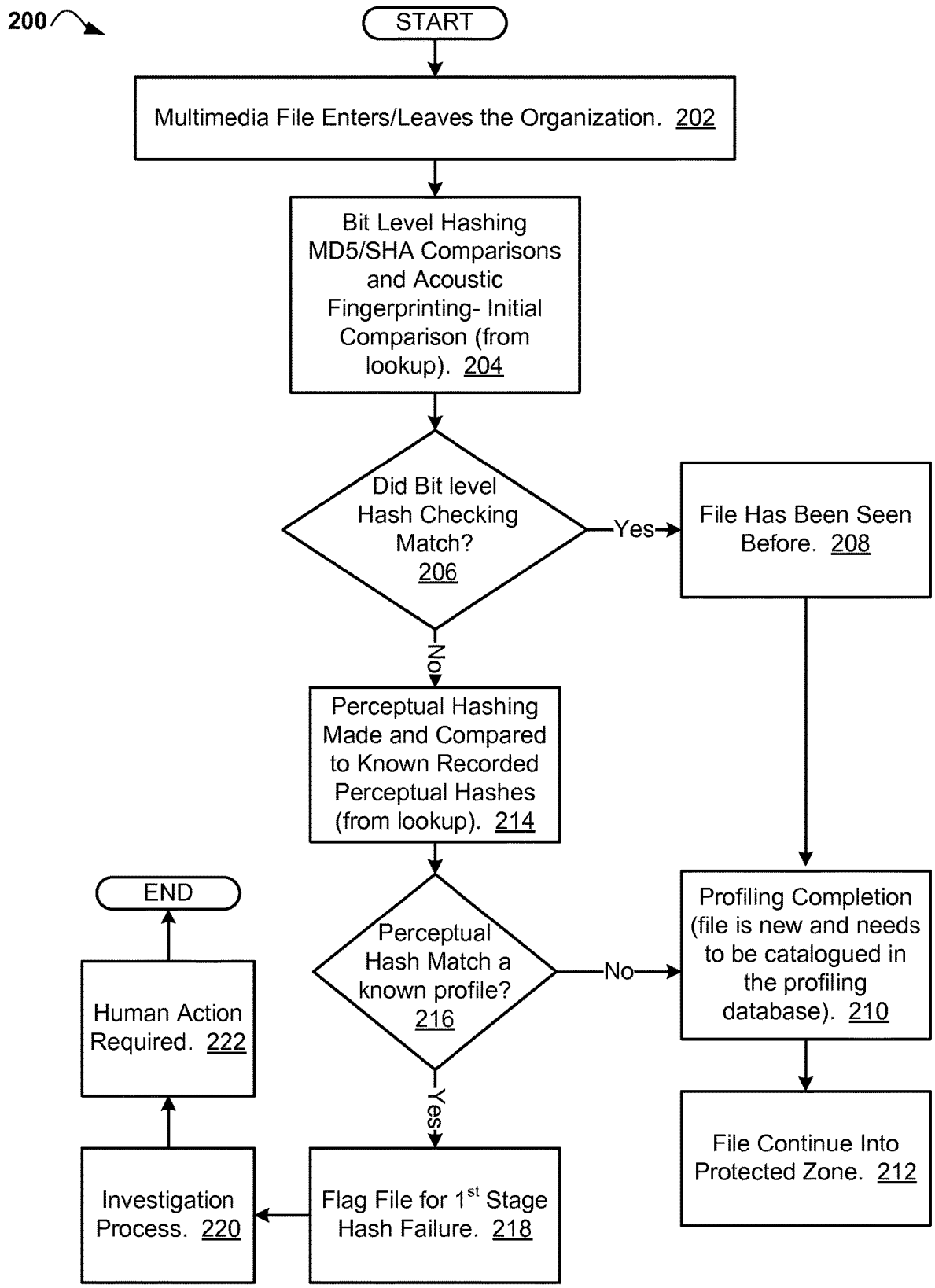
FIG. 2A-2B is an operational flowchart illustrating the steps carried out by a program to detect steganography on the perimeter.
Figure 2B:
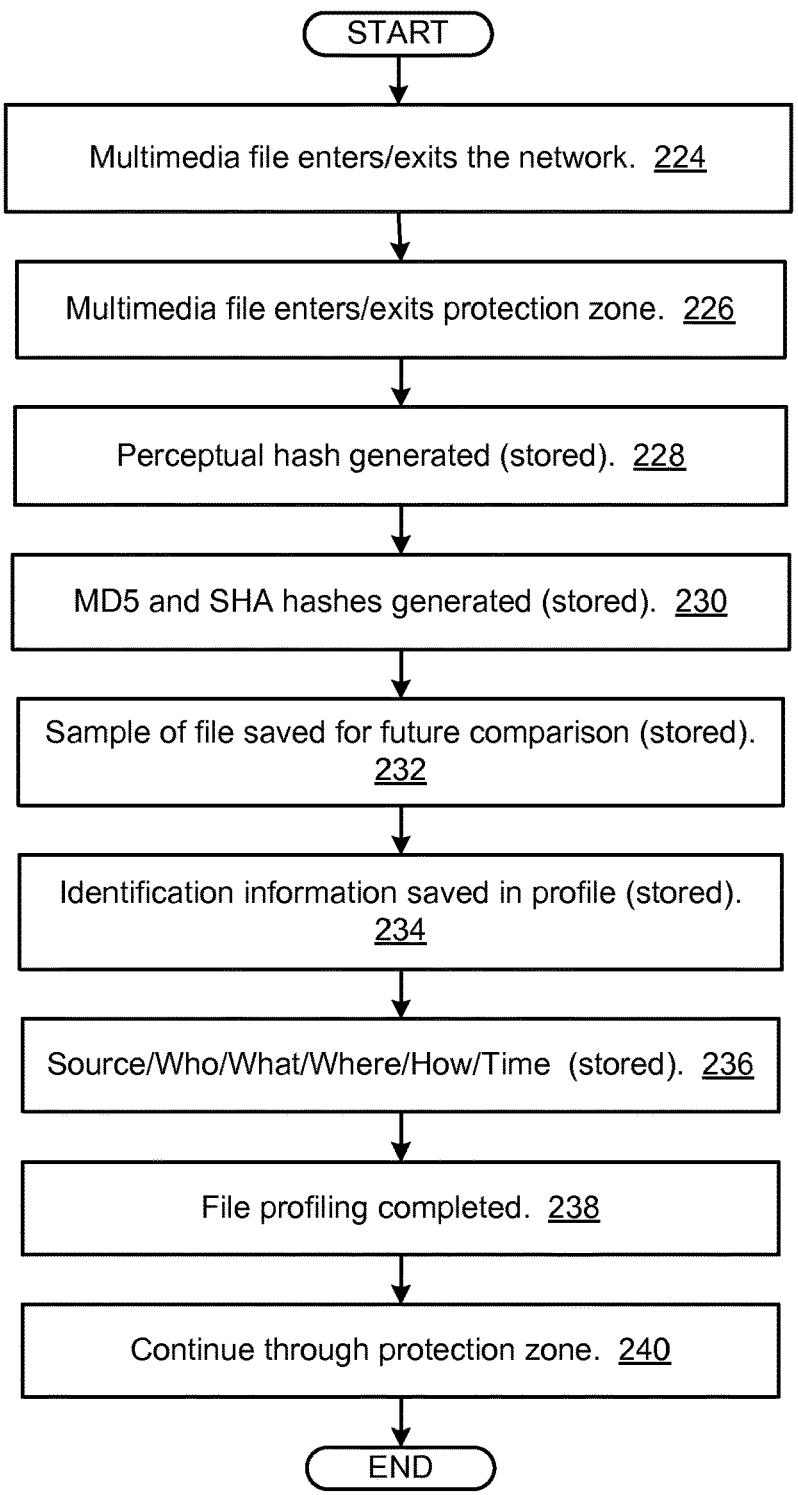

Referring now to FIG. 2A-2B, an operational flowchart 200 illustrating the steps carried out by a program that detects steganography on the perimeter. As such, FIG. 2A-2B depicts a typical hashing sequence checking flow that a multimedia file may go through when entering or exiting a network or an organization. More specifically, the present embodiment may create both a perceptual and conventional hash of an image at time of creation or entry into a network or an organization (where the perceptual hash captures how it 'looks' versus the conventional hash which captures what is consists in terms of bits and bytes) and then, when an image leaves the organization, the present embodiment may compare the conventional hash of the file to a cache or database version to determine if the file has been 'seen' before (and therefore trusted) and, if not, then the present embodiment may compare the perceptual hashes to see if they look the same as a 'known' file. A file that is new, but has the same visual appearance, may be determined to be a 'known' file and therefore, may be flagged as potential steganography.

FIG. 2A depicts a hashing circle flow showing how a file is inspected not knowing whether the file has ever been seen before; when files are profiled; and also what action needs to be taken when any one of the hashes fail in the profile. A successful profile match means that the Detection of Steganography on the Perimeter Program 116A, 116B (FIG. 1) has seen both hashes in the profile before. However, both hashes need to be matched in the profile on the checking stage when a multimedia file enters or exits the network in order for it to successfully pass through the system. If any one of the hash checks in the profiling stage fails then a flag is raised to an inspection mechanism.

Therefore with respect to FIG. 2A at 202, a multimedia file either enters or exits a network or an organization. Then at 204, bit level hashing is performed. As such MD5/SHA comparisons and acoustic fingerprinting comparisons (from a lookup) may be performed. According to the present embodiment, MD5/SHA hashes may be generated for the file and a search through a database (e.g., database 112 (FIG. 1)) of previously stored known files is performed to find the hash.

Next at 206, it is determined whether a match was found based on the bit level hash checking. If the MD5/SHA hashes match a saved known version of the file, then the Detection of Steganography on the Perimeter Program 116A, 116B (FIG. 1) can conclusively determine that the file structure has stayed the same.

Therefore, if at 206 it is determined that a match was found, then at 208, the Detection of Steganography on the Perimeter Program 116A, 116B (FIG. 1) will confirm that the file has been seen before and has retained its structure.

Next at 210, the profiling is completed since the file has been determined to be new, it needs to be catalogued in the profiling database.

Then at 212, the file will continue into the protected zone. As such, according to at least one implementation, the file will continue on its path after the file has been profiled and stored in a repository, such as database 112 (FIG. 1).

However, if at step 206, the bit level hash checking has failed (i.e., if MD5/SHA hash is not found in the database), then it is determined that either the file has been tampered with or it has never been seen before, and a profile needs to be setup for it and therefore, more checks are required.

As such, if at 206 it is determined that the bit level has checking has failed (i.e., a match was not found), then the method may continue to step 214 so that a perceptual hashing is made and compared to known recorded perceptual hashes (from a lookup). According to at least one implementation, a perceptual Hash (pHash) algorithm may be used to generate a perceptual hash of the image. As such, a lookup may be performed in the database of known files with two possible outcomes being either a match is found or a match is not found. If a match is found, then it confirms the file has been altered. If no match has been found, then it confirms that the file has never been seen before and a profile is required.

Therefore, it is determined at 216 whether a perceptual hashing match has been found. If at 216 it is determined that no perceptual hashing match is found, then the method will proceed to step 210 to confirm that the file has never been seen before and to perform profiling completion (as previously described above with respect to step 210) since a profile is required.

However, if at 216 it is determined that a perceptual hashing match has been found, then the method will continue to step 218 to flag the file for a first stage hash failure. According to the present embodiment, a flag is raised identifying the file as suspect since the bit level hash failed, but the perceptual hash was matched to a previously known file and therefore, further investigation is required. Therefore, a file that is new, but has the same visual appearance as a "known" file is flagged as potential steganography. As such, the method will proceed to step 220 where an investigation process may be performed and following the investigation, to step 222, where human action may be required and disclosure further is based on the corporate policies.

FIG. 2B illustrates the 'profiling' only flow depicting how the profiling steps work one level down in detail taking into account the file being inspected has never been seen before and needs to be profiled.

Therefore, with respect to FIG. 2B at 224, the multimedia file enters or exits the network. Then at 226, the multimedia file enters or exits the protection zone. Next at 228, the perceptual hash is generated and stored. Then at 230, the MD5 and SHA hashes are generated and stored. Next at 232, a sample of the file is saved (i.e., stored) for future comparison. Then at 234, identification information is saved in a profile which is stored. Next at 236, information pertaining to the file, such as the source, who, what, where, how and time is stored. Then at 238, the file profiling is completed and at 240, the file continues through the protection zone.

It may be appreciated that FIG. 2A-2B provides only an illustration of one implementation and does not imply any limitations with regard to how different embodiments may be implemented. Many modifications to the depicted environments may be made based on design and implementation requirements. For example, the present embodiment may hide specific files to detect steganography. Some current practices promote the classification of very sensitive information to properly classify the content and file itself as 'classified or confidential material'. The classification of confidential information is also used in Data Loss Prevention (DLP) systems to detect if confidential information is being leaked out of the organization through conventional methods, such as file upload services or emails. Steganography is used to conceal a message, image, or file within another message, image, or file. Using steganography to hide a confidential document behind a multimedia file will increase the multimedia file size in bytes with the total amount of bytes of the confidential document being hidden.

Therefore, according to at least one implementation of the present embodiment basic math may be used to determine how file sizes effect each other. For example, the following basic math illustrates how the file sizes will effect each other:

original multimedia file size in bytes+confidential document file size in bytes=steganography'd file size in bytes.

The "original multimedia file size in bytes" was recorded in bytes along with a sample of the original file when the file entered the organization and the "hidden document file size in bytes" was recorded during classification phase of the confidential document. Therefore, according to the present embodiment, the "steganography'd file size in bytes" will be the newly modified image/audio file size in bytes.

According to at least one implementation, the present embodiment may take into account and capture the file name, hashes, and total amount of bytes in size for every multimedia file entering and leaving the network or organization. As such, the present embodiment may be able to identify that a specific multimedia file has been modified. Therefore a "failure" status may be used as the identifier to flag a multimedia file as suspect and to subject it to StegAnalysis for deeper investigation.

Additionally, the present embodiment may label every multimedia file entering a network or an organization to detect steganography. Therefore, on image entry into the network or the organization (i.e., when an image or video file enters the online environment of a network or an organization, such as a company), the present embodiment may use steganography to hide a small 1 kb image/watermark in the file describing the user identification information that downloaded or transferred the file.

Then, on exiting the network or the organization (i.e., when an image or video file leaves the network or the organization), the present embodiment may extract the user identification information that was hidden by the present embodiment in the image. As such, the hidden information may act as a stamp of "stego-approval" that the file has been "labelled". Therefore, if extraction of the image/watermark fails then two possible reasons may exist. The first possible reason may be that the image was created inside the network or the organization, and therefore, the action to be taken by the present embodiment is to watermark the file now before the file leaves the network or the organization. This may be especially useful for employees that create simple images in applications which they use to hide sensitive information by using steganography.

The second possible reason may be that the file has been tampered with, and the possibility of Steganography exists in this file. Therefore, the first action by the present embodiment may be to flag the file for inspection. The second action may be to use steganography again on the image to erase any steganography that might have been used inside the network or the organization to hide sensitive information. Such an action may be effective in protecting the sensitive information from leaking out of the network or the organization. Additionally, such an action may keep the failed image as evidence as well as raise a flag for investigation. Then, suspect files may be quarantined for StegAnalysis to be performed.

Figure 3:
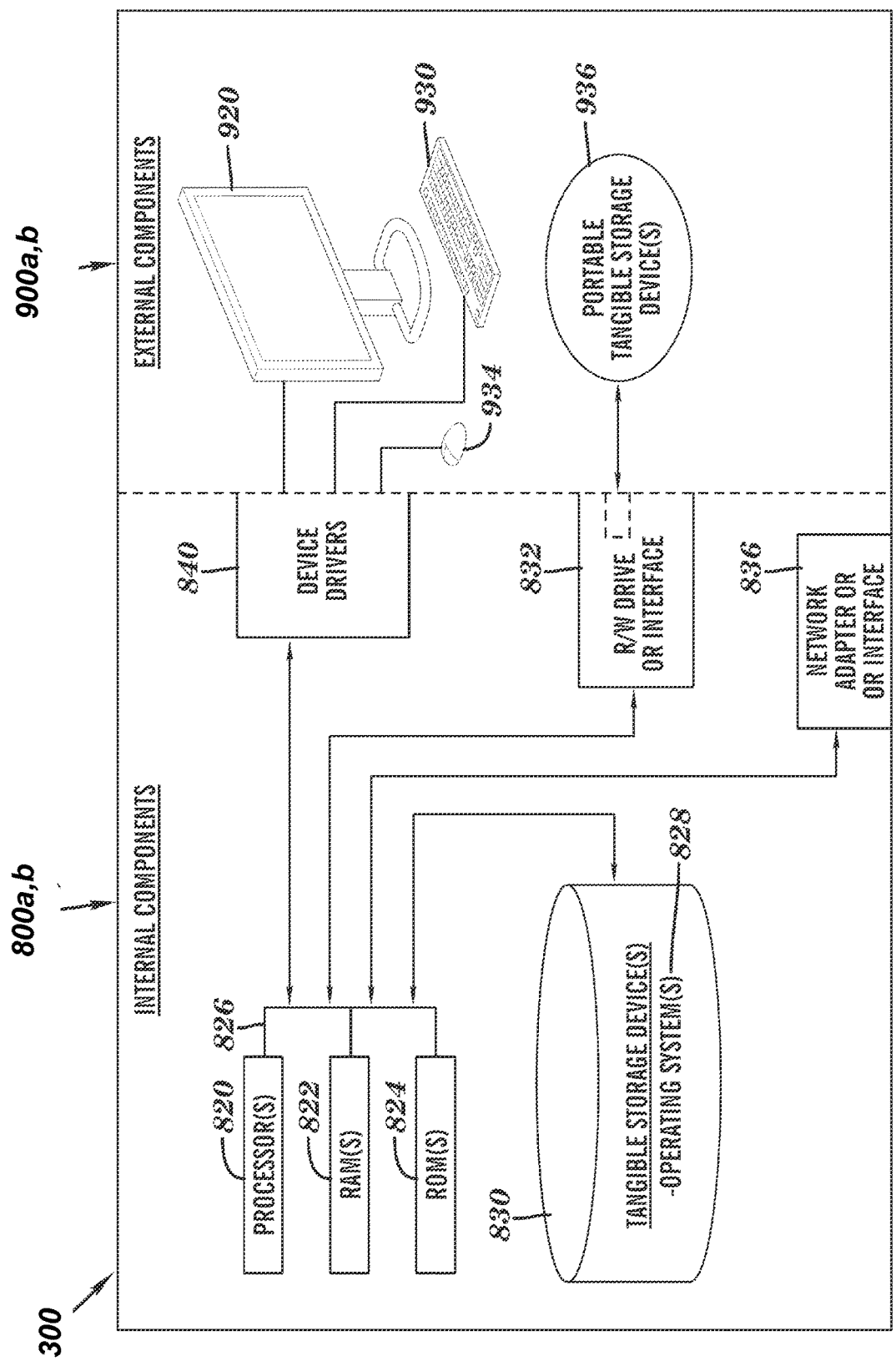
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Detection of Steganography on the Perimeter Program 116A (FIG. 1) in client computer 102 (FIG. 1) and the Detection of Steganography on the Perimeter Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Detection of Steganography on the Perimeter Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Detection of Steganography on the Perimeter Program 116A (FIG. 1) in client computer 102 (FIG. 1) and the Detection of Steganography on the Perimeter Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Detection of Steganography on the Perimeter Program 116A (FIG. 1) in client computer 102 (FIG. 1) and the Detection of Steganography on the Perimeter Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
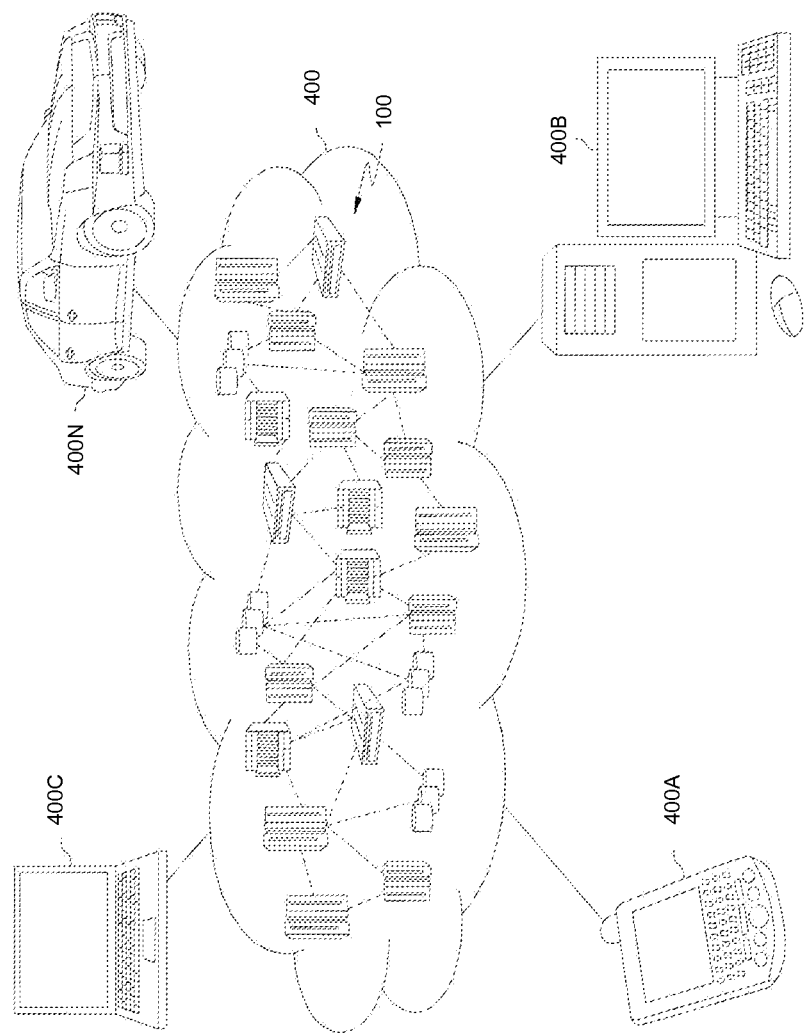
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
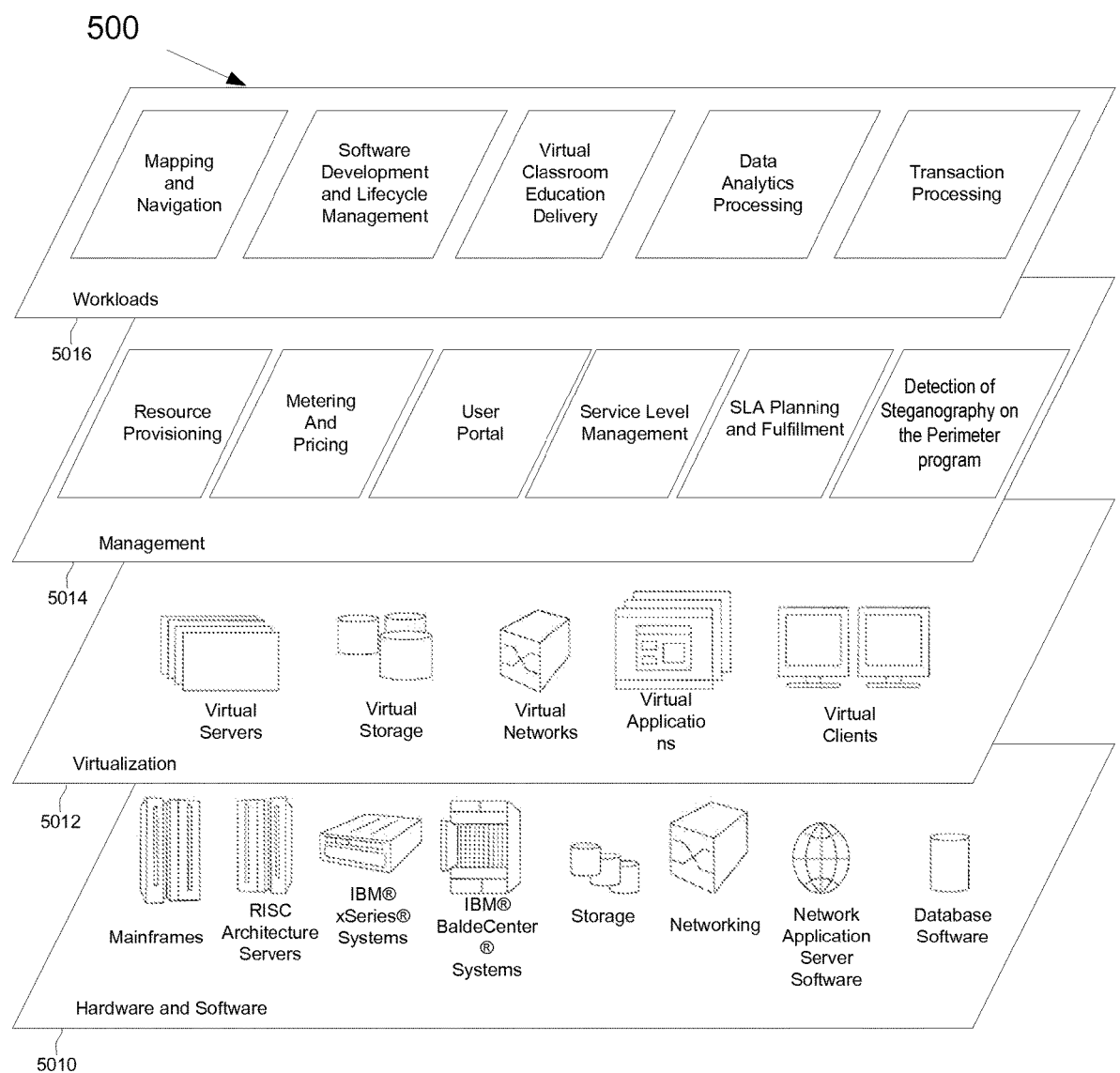
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Detection of Steganography on the Perimeter Program may improve the detection of steganography on the perimeter.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
receiving a multimedia file;
generating a bit level hash of the multimedia file;
generating a perceptual hash of the multimedia file;
comparing the bit level hash of the multimedia file to an original bit level hash of an original multimedia file, wherein the original bit level hash was created when a profile was created for the original multimedia file;
determining that the bit level hash comparison does not match;
comparing the perceptual hash of the multimedia file to an original perceptual hash of the original multimedia file, wherein the original perceptual hash was created when the profile was created for the original multimedia file;
determining that the perceptual hash comparison matches;
flagging the multimedia file based on the mismatch of the bit level hash comparison and the match of the perceptual hash comparison; and
determining that the multimedia file has been modified; and
triggering an investigation.

2. The computer implemented method of claim 1, further comprising:
receiving the original multimedia file;
labeling the original multimedia file by attaching a watermark to the original multimedia file, wherein steganography is used to hide the watermark, wherein the watermark alters an original multimedia file size in bytes;
generating and storing the original perceptual hash of the original multimedia file;
generating and storing the original bit level hash of the original multimedia file;
storing a copy of the original multimedia file; and
creating a profile for the original multimedia file using the original perceptual hash, the original bit level hash, the copy of the original multimedia file, the watermark, and a plurality of identification information.

3. The method of claim 2, wherein the plurality of identification information includes data pertaining to when the original multimedia file was downloaded, a username that downloaded the multimedia file, a computing device identifier that downloaded the multimedia file, an original file size in bytes of the original multimedia file, an acoustic fingerprinting of the original multimedia file and audio content associated with the original multimedia file.

4. The method of claim 1, wherein the bit level hash includes a message digest (MD5) hash or a secure hash algorithm (SHA) hash.

5. The method of claim 1, wherein the perceptual hash captures an image of the original multimedia file and an image of the multimedia file.

6. The method of claim 1, wherein the original multimedia file is a first file entering a network and the multimedia file is a second file re-entering the network, wherein a profile of the first file is created for future comparisons between the first file and the second file.

7. The method of claim 1, wherein the investigation includes a human action, wherein the investigation is based on corporate policies.

8. A computer system, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving a multimedia file;
generating a bit level hash of the multimedia file;
generating a perceptual hash of the multimedia file;
comparing the bit level hash of the multimedia file to an original bit level hash of an original multimedia file, wherein the original bit level hash was created when a profile was created for the original multimedia file;
determining that the bit level hash comparison does not match;
comparing the perceptual hash of the multimedia file to an original perceptual hash of the original multimedia file, wherein the original perceptual hash was created when the profile was created for the original multimedia file;
determining that the perceptual hash comparison matches;
flagging the multimedia file based on the mismatch of the bit level hash comparison and the match of the perceptual hash comparison; and
determining that the multimedia file has been modified; and
triggering an investigation.

9. The computer system of claim 8, further comprising:
receiving the original multimedia file;
generating and storing the original perceptual hash of the original multimedia file;
generating and storing the original bit level hash of the original multimedia file;
storing a copy of the original multimedia file;
labeling the original multimedia file by attaching a watermark to the original multimedia file, wherein steganography is used to hide the watermark, wherein the watermark alters an original multimedia file size in bytes; and
creating a profile for the original multimedia file using the original perceptual hash, the original bit level hash, the copy of the original multimedia file, the watermark, and a plurality of identification information.

10. The computer system of claim 9, wherein the plurality of identification information includes data pertaining to when the original multimedia file was downloaded, a username that downloaded the multimedia file, a computing device identifier that downloaded the multimedia file, an original file size in bytes of the original multimedia file, an acoustic fingerprinting of the original multimedia file and audio content associated with the original multimedia file.

11. The computer system of claim 8, wherein the bit level hash includes a message digest (MD5) hash or a secure hash algorithm (SHA) hash.

12. The computer system of claim 8, wherein the perceptual hash captures an image of the original multimedia file and an image of the multimedia file.

13. The computer system of claim 8, wherein the original multimedia file is a first file entering a network and the multimedia file is a second file re-entering the network, wherein a profile of the first file is created for future comparisons between the first file and the second file.

14. The computer system of claim 8, wherein the investigation includes a human action, wherein the investigation is based on corporate policies.

15. A computer program product, comprising:
one or more computer-readable tangible storage media and program instructions stored on at least one of the one or more computer-readable tangible storage media, the program instructions executable by a processor to cause the processor to perform a method comprising:

receiving a multimedia file;
generating a bit level hash of the multimedia file;
generating a perceptual hash of the multimedia file;
comparing the bit level hash of the multimedia file to an original bit level hash of an original multimedia file, wherein the original bit level hash was created when a profile was created for the original multimedia file;
determining that the bit level hash comparison does not match;
comparing the perceptual hash of the multimedia file to an original perceptual hash of the original multimedia file, wherein the original perceptual hash was created when the profile was created for the original multimedia file;
determining that the perceptual hash comparison matches;
flagging the multimedia file based on the mismatch of the bit level hash comparison and the match of the perceptual hash comparison; and
determining that the multimedia file has been modified; and
triggering an investigation.

16. The computer program product of claim 15, further comprising:
receiving the original multimedia file;
generating and storing the original perceptual hash of the original multimedia file;
generating and storing the original bit level hash of the original multimedia file;
storing a copy of the original multimedia file;
labeling the original multimedia file by attaching a watermark to the original multimedia file, wherein steganography is used to hide the watermark, wherein the watermark alters an original multimedia file size in bytes; and
creating a profile for the original multimedia file using the original perceptual hash, the original bit level hash, the copy of the original multimedia file, the watermark, and a plurality of identification information.

17. The computer program product of claim 15, wherein the bit level hash includes a message digest (MD5) hash or a secure hash algorithm (SHA) hash.

18. The computer program product of claim 15, wherein the perceptual hash captures an image of the original multimedia file and an image of the multimedia file.

19. The computer program product of claim 15, wherein the original multimedia file is a first file entering a network and the multimedia file is a second file re-entering the network, wherein a profile of the first file is created for future comparisons between the first file and the second file.

20. The computer program product of claim 15, wherein the investigation includes a human action, wherein the investigation is based on corporate policies.

* * * * *